(12) United States Patent
Matsuhira

(10) Patent No.: US 8,837,848 B2
(45) Date of Patent: Sep. 16, 2014

(54) IMAGE PROCESSING DEVICE AND IMAGE PROCESSING METHOD

(71) Applicant: Seiko Epson Corporation, Tokyo (JP)

(72) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/673,847

(22) Filed: Nov. 9, 2012

(65) Prior Publication Data

US 2013/0121604 A1 May 16, 2013

(30) Foreign Application Priority Data

Nov. 11, 2011 (JP) ................................. 2011-247148

(51) Int. Cl.
*G06K 9/36* (2006.01)
*G06T 9/00* (2006.01)
(52) U.S. Cl.
CPC ...................................... *G06T 9/007* (2013.01)
USPC ......................................................... 382/250
(58) Field of Classification Search
None
See application file for complete search history.

(56) References Cited

U.S. PATENT DOCUMENTS

| | | | | |
|---|---|---|---|---|
| 6,122,321 | A * | 9/2000 | Sazzad et al. ............ | 375/240.03 |
| 6,148,032 | A * | 11/2000 | Pearlstein et al. ....... | 375/240.15 |
| 6,385,248 | B1 * | 5/2002 | Pearlstein et al. ....... | 375/240.25 |
| 7,509,668 | B2 * | 3/2009 | Parulski ........................ | 725/105 |
| 8,589,241 | B2 * | 11/2013 | Wolcott et al. ............... | 705/26.1 |
| 2007/0014476 | A1 * | 1/2007 | Marcellin et al. ............. | 382/232 |
| 2010/0110222 | A1 * | 5/2010 | Smith et al. ................ | 348/222.1 |
| 2010/0231967 | A1 | 9/2010 | Arai | |

FOREIGN PATENT DOCUMENTS

| | | |
|---|---|---|
| JP | 10-210501 A | 8/1998 |
| JP | 2002-271794 A | 9/2002 |
| JP | 2010-213093 A | 9/2010 |
| JP | 2010-258576 A | 11/2010 |

\* cited by examiner

*Primary Examiner* — Brian P Werner
*Assistant Examiner* — Feng Niu
(74) *Attorney, Agent, or Firm* — Nutter McClennen & Fish LLP; John J. Penny, Jr.

(57) ABSTRACT

In the printer, the correction content setting portion sets equal to or more than one correction contents, the decimation rate setting portion sets decimation rates for respective planes of Y, Cb, and Cr of JPEG data (compressed data) based on the set correction contents. Pixels are decimated at the set decimation rates and the decompression processing unit decompresses the JPEG data so as to generate image data. In this manner, decimation processing is performed in accordance with the plurality of correction contents. Therefore, for example, inverse quantization processing, inverse DCT operation processing, and the like, can be omitted in accordance with the correction contents. The decompression processing may be executed on a sampling image to be used for sampling when the contents of correction to be performed on the image data are determined and on a print image to be used for printing.

17 Claims, 9 Drawing Sheets

FIG. 2

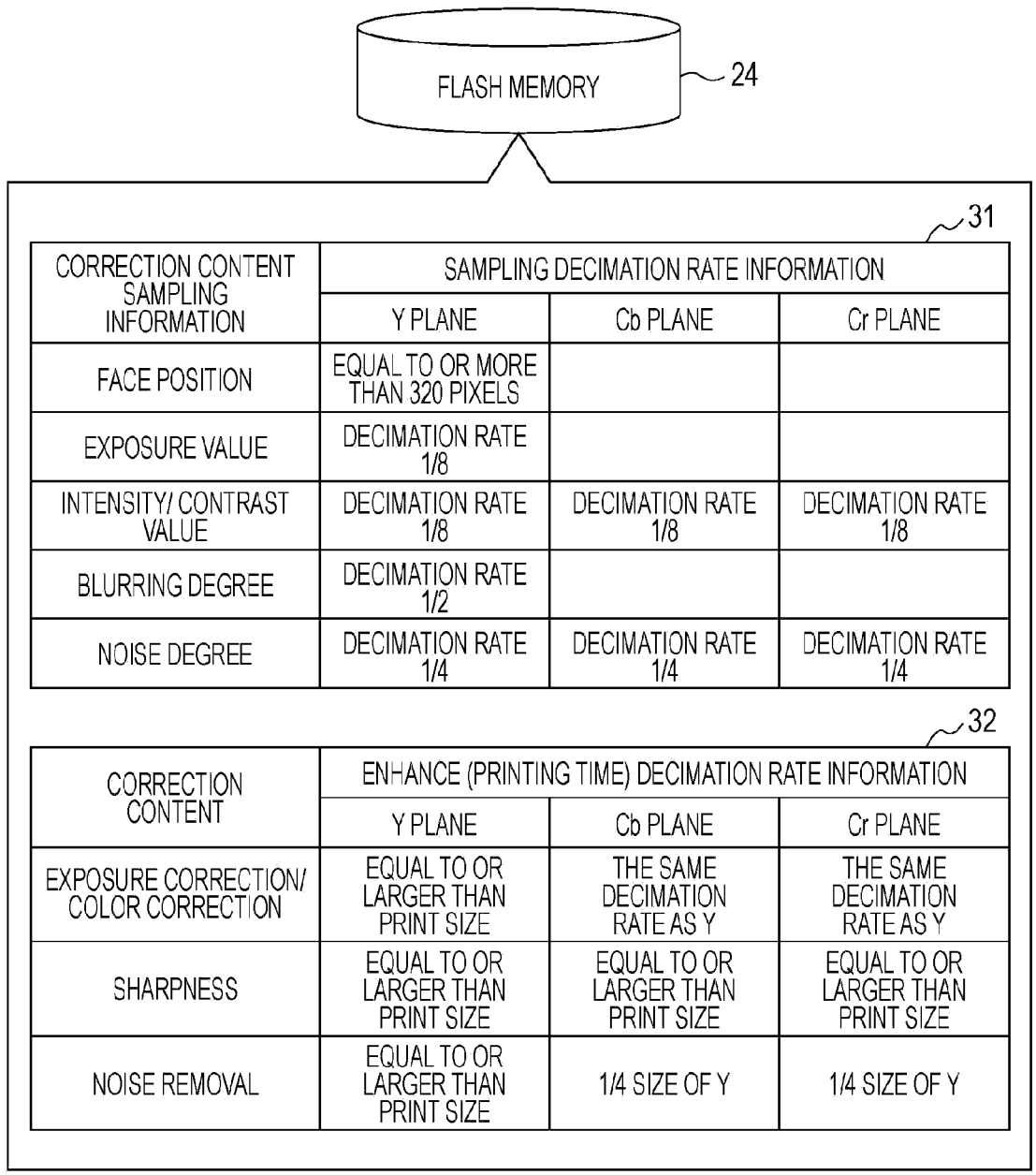

| CORRECTION CONTENT SAMPLING INFORMATION | SAMPLING DECIMATION RATE INFORMATION | | |
|---|---|---|---|
| | Y PLANE | Cb PLANE | Cr PLANE |
| FACE POSITION | EQUAL TO OR MORE THAN 320 PIXELS | | |
| EXPOSURE VALUE | DECIMATION RATE 1/8 | | |
| INTENSITY/ CONTRAST VALUE | DECIMATION RATE 1/8 | DECIMATION RATE 1/8 | DECIMATION RATE 1/8 |
| BLURRING DEGREE | DECIMATION RATE 1/2 | | |
| NOISE DEGREE | DECIMATION RATE 1/4 | DECIMATION RATE 1/4 | DECIMATION RATE 1/4 |

| CORRECTION CONTENT | ENHANCE (PRINTING TIME) DECIMATION RATE INFORMATION | | |
|---|---|---|---|
| | Y PLANE | Cb PLANE | Cr PLANE |
| EXPOSURE CORRECTION/ COLOR CORRECTION | EQUAL TO OR LARGER THAN PRINT SIZE | THE SAME DECIMATION RATE AS Y | THE SAME DECIMATION RATE AS Y |
| SHARPNESS | EQUAL TO OR LARGER THAN PRINT SIZE | EQUAL TO OR LARGER THAN PRINT SIZE | EQUAL TO OR LARGER THAN PRINT SIZE |
| NOISE REMOVAL | EQUAL TO OR LARGER THAN PRINT SIZE | 1/4 SIZE OF Y | 1/4 SIZE OF Y |

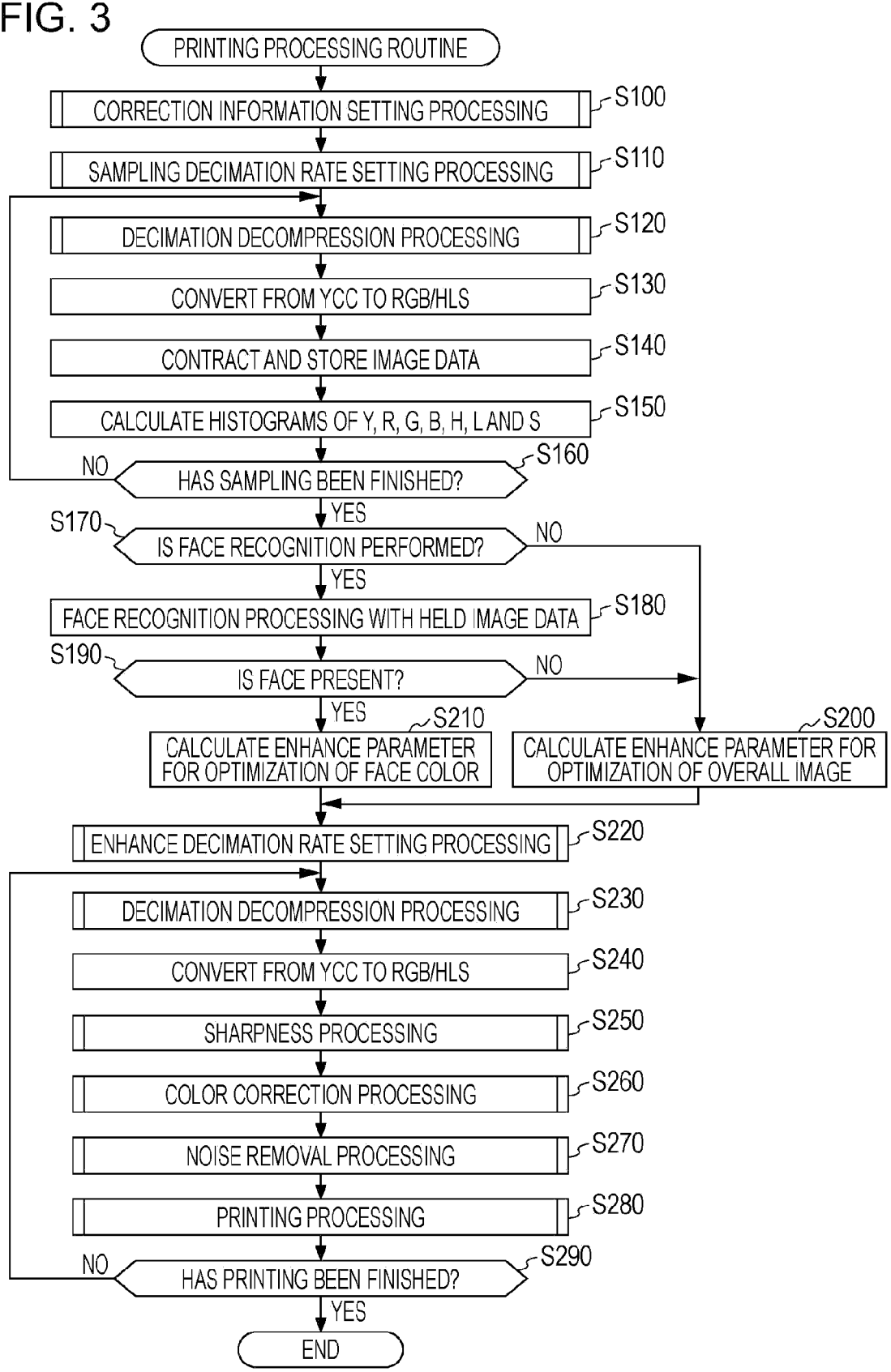

IMAGE PROCESSING DEVICE AND IMAGE PROCESSING METHOD

CROSS REFERENCES TO RELATED APPLICATIONS

The entire disclosure of Japanese Patent Application No. 2011-247148, filed Nov. 11, 2011 is expressly incorporated by reference herein.

BACKGROUND

1. Technical Field

The present invention relates to an image processing device and an image processing method.

2. Related Art

The following existing image processing device has been proposed (for example, see, JP-A-2002-271794). That is, in the existing image processing device, Huffman decoding, run-length Huffman decoding, and inverse quantization are performed on a JPEG image as a sampling target. Then, pixels as pixel value acquisition targets are selected among 64 pixels in total for each of obtained blocks of 8×8 and inverse DCT operation is performed on the selected pixels only. With this, a compressed image is sampled to be displayed. In the device, the inverse DCT operation is performed on the selected pixels only so that processing load for sampling and displaying the compressed image can be reduced and a processing time length can be reduced.

In the above-described device, the inverse DCT operation is performed on the selected pixels only so that the processing load can be reduced and the processing time length can be reduced. However, reduction in the processing load is not sufficient. Therefore, reduction in the processing load and reduction in the processing time have been further desired.

SUMMARY

An advantage of some aspects of the invention is to provide an image processing device and an image processing method which are capable of reducing the load and processing time of decompression processing to be performed on compressed data more appropriately.

The aspects of the invention employ following means for achieving the above-described main advantage.

An image processing device according to an aspect of the invention that decompresses compressed data which has a plurality of planes and has been compressed with a compression method with DCT operation so as to generate image data, the image processing device including a correction content setting unit that sets equal to or more than one correction contents relating to the image data, a decimation rate setting unit that sets a decimation rate for each of the plurality of planes based on the set correction contents, and a decompression processing unit that decimates pixels at the decimation rate set for each of the plurality of planes and decompresses the compressed data so as to generate the image data.

In the image processing device, equal to or more than one correction contents are set, a decimation rate is set for each of the planes of the compressed data based on the set correction contents, pixels are decimated at the set decimation rates, and the compressed data is decompressed so as to generate the image data. In this manner, decimation processing is performed in accordance with the correction contents. Therefore, for example, inverse quantization processing, inverse DCT operation processing, and the like, can be omitted in accordance with the correction contents. Accordingly, the load and processing time of decompression processing to be performed on the compressed data can be reduced more appropriately. An expression "decimation rate" indicates a ratio of the number of pixels in the lateral and longitudinal directions after decimation with respect to the number of pixels before the decimation. The expression, the decimation rate is 1, indicates that the decimation is not performed. As the decimation rate is lowered to ½, ¼, and ⅛, the decimation is performed such that the number of pixels on the image data is decreased in this order. Further, the decompression processing unit may decimate the pixels using the set decimation rates and perform the inverse quantization and the inverse DCT operation so as to generate the image data.

In the image processing device according to the aspect of the invention, it is preferable that the correction content setting unit set the correction contents including equal to or more than one of face information, exposure degree, intensity, contrast, blurring degree and noise degree, the decimation rate setting unit set the decimation rates for the planes in accordance with the correction contents including equal to or more than one of the face information, the exposure degree, the intensity, the contrast, the blurring degree and the noise degree. With this, the decimation processing is performed in accordance with the face information, the exposure degree, the intensity, the contrast, the blurring degree and the noise degree. Accordingly, the load and processing time of the decompression processing to be performed on the compressed data can be reduced in accordance with the correction contents more appropriately.

In the image processing device according to the aspect of the invention, it is preferable that the decimation rate setting unit set decimation rates of a sampling image to be used for sampling when the contents of correction to be performed on the image data are determined, and the decompression processing unit decimate pixels at the set decimation rates so as to generate the sampling image. With this, when the sampling image is generated, the load and processing time of the decompression processing to be performed on the compressed data can be reduced more appropriately. In this case, it is preferable that the decimation rate setting unit set the decimation rates for the planes with a tendency in that pixels to be decimated for correction contents grasping tendency of an overall image are larger than pixels to be decimated for correction contents grasping details of the image. With this, the decimation processing is performed with the tendency in that pixels to be decimated are smaller (the decimation is not performed) for the correction contents grasping the details of the image. On the other hand, the decimation processing is performed with a tendency in that pixels to be decimated are larger (many pixels are decimated) for the correction contents grasping the tendency of the overall image. Therefore, the sampling image can be generated by executing more appropriate decimation processing. Note that as the correction contents grasping the details of the image, for example, the face information, the blurring degree, the noise degree, and the like are included. On the other hand, as the correction contents grasping the tendency of the overall image, for example, the exposure degree, the intensity, the contrast, and the like are included. It is to be noted that the expression "a tendency in that pixels to be decimated become larger" encompasses a case where there is fluctuation in the ranking order of the decimation rates.

In the image processing device according to the aspect of the invention, it is preferable that the correction content setting unit set contents of correction to be performed on a print image of the image data, the decimation rate setting unit set decimation rates of the print image data, and the decompression processing unit decimate pixels at the set decimation rates so as to generate the print image. With this, when the print image data is generated, the load and processing time of the decompression processing to be performed on the compressed data can be reduced more appropriately. In this case, it is preferable that the decimation rate setting unit set the decimation rates of the print image data such that an image having a size of equal to or larger than a specified print size is generated. With this, the load and processing time of the decompression processing to be performed on the compressed data can be reduced more appropriately while suppressing lowering of image quality of the print image.

In the image processing device according to the aspect of the invention, it is preferable that the correction content setting unit set a plurality of correction contents, and the decimation rate setting unit set decimation rates for generating larger image data among decimation rates which are made to correspond to the plurality of set correction contents to the decimation rates for the planes. With this, the load and processing time of the decompression processing to be performed on the compressed data can be reduced more appropriately while further suppressing lowering of image quality of the image data.

In the image processing device according to the aspect of the invention, it is preferable that the compressed data be any one or both of JPEG data and MPEG data.

An image processing method according to another aspect of the invention for decompressing compressed data which has a plurality of planes and has been compressed with a compression method with DCT operation so as to generate image data, the image processing method including setting equal to or more than one correction contents relating to the image data, setting a decimation rate for each of the plurality of planes based on the set correction contents, and decimating pixels at the decimation rate set for each of the plurality of planes and decompressing the compressed data so as to generate the image data.

In the image processing method, decimation processing is performed in accordance with the correction contents in the same manner as the above-described image processing device. Therefore, for example, inverse quantization processing, inverse DCT operation processing, and the like, can be omitted in accordance with the correction contents. Accordingly, the load and processing time of the decompression processing to be performed on the compressed data can be reduced more appropriately. It is to be noted that in the image processing method, various types of modes in the above-described image processing device may be employed or processes for realizing functions of the above-described image processing device may be added.

A computer-readable medium on which is stored a program in the aspect of the invention causes equal to or more than one computer to realize the processes of the control method in the above-described image processing method. The program may be recorded in a computer-readable recording medium (for example, hard disk, ROM, FD, CD, DVD, and the like), or may be distributed from one computer to another computer through a transfer medium (communication network such as the Internet and LAN). Alternatively, the program may be transmitted and received in any other modes. If the program is caused to be executed by one computer or a plurality of computers by dividing the processes, the processes in the above-described image processing method can be executed. Therefore, the same action effects as those obtained by the image processing method can be obtained.

BRIEF DESCRIPTION OF THE DRAWINGS

The invention will be described with reference to the accompanying drawings, wherein like numbers reference like elements.

FIG. 2 is a descriptive diagram of sampling decimation rate information and enhance decimation rate information.

FIG. 3 is a flowchart illustrating an example of a printing processing routine.

DESCRIPTION OF EXEMPLARY EMBODIMENTS

Figure 1:
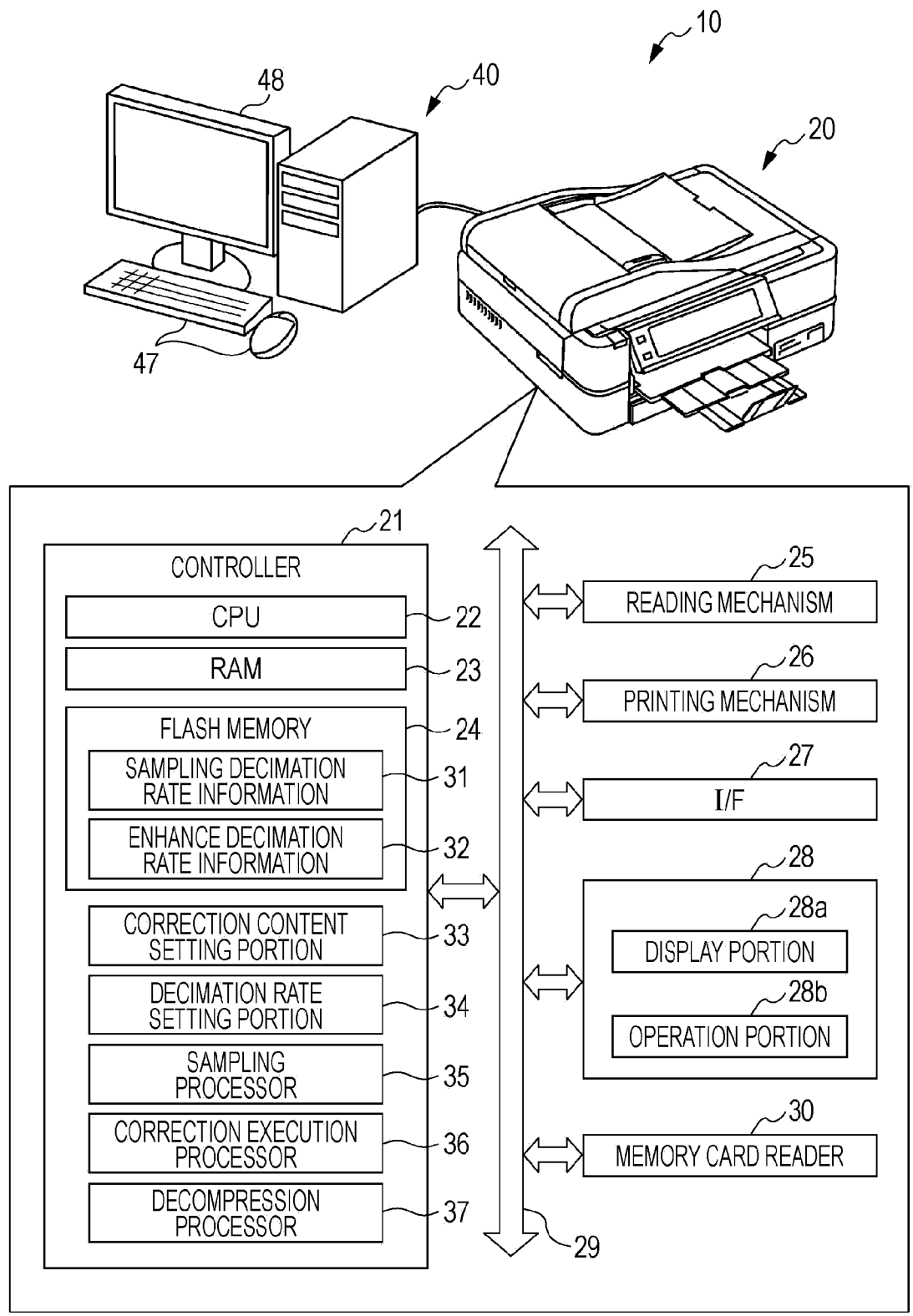
FIG. 1 is a configuration diagram illustrating a schematic configuration of a printer system.

Next, an example of an embodiment of the invention is described with reference to the drawings. FIG. 1 is a configuration diagram illustrating a schematic configuration of a printer system 10 as the embodiment. The printer system 10 in the embodiment includes a printer 20 as an image processing device according to the invention and a personal computer (PC) 40. The PC 40 is connected to the printer 20, includes an input device 47 and a display 48, and issues a print direction and the like. The printer 20 includes a controller 21, a reading mechanism 25, and a printing mechanism 26. The controller 21 controls the printer 20 overall. The reading mechanism 25 reads a reading document placed on a glass surface. The printing mechanism 26 forms an image on a print medium by using a colorant. Further, the printer 20 includes an interface (I/F) 27, an operation panel 28, and a memory card reader 30. The I/F 27 transmits and receives information to and from an external apparatus. The operation panel 28 displays various pieces of information and receives input from a user. The memory card reader 30 handles input and output of data to and from a memory card. The printer 20 includes the reading mechanism 25 and the printing mechanism 26, and is configured as a multifunction printer having a printer function, a scanner function, and a copying function. In the printer 20, the controller 21, the reading mechanism 25, the printing mechanism 26, the I/F 27, the operation panel 28, and the memory card reader 30 are electrically connected to one another through a bus 29.

The controller 21 is configured as a microprocessor centered on a CPU 22. The controller 21 includes a RAM 23 which temporarily stores data and saves data and a flash memory 24 which stores various types of processing programs and can rewrite data. The controller 21 controls the reading mechanism 25 so as to execute image reading processing and controls the printing mechanism 26 so as to execute printing processing.

A sampling decimation rate information 31 and an enhance decimation rate information 32 are stored in the flash memory 24. FIG. 2 is a descriptive diagram of the sampling decimation rate information 31 and the enhance decimation rate information 32. The sampling decimation rate information 31 is used for setting decimation rates for decompressing a sampling image to be used for sampling when correction values of correction processing to be performed on image data are determined. An expression "decimation rate" indicates a ratio of the number of pixels in the lateral and longitudinal directions after decimation with respect to the number of pixels before the decimation. The expression, the decimation rate is 1, indicates that the decimation is not performed. As the decimation rate is lowered to ½, ¼, and ⅛, the decimation is performed such that the number of pixels on the image data is decreased in this order. In the sampling decimation rate information 31, decimation rates are made to correspond to a face position, an exposure value, intensity, a contrast value, blurring degree, and noise degree as correction contents. If the correction contents are given, decimation rates can be introduced. In this case, the decimation rate is defined for each of a Y plane, a Cb plane, and a Cr plane of JPEG data as compressed data which has been compressed with a compression method with DCT operation, as illustrated in FIG. 2. To be more specific, "equal to or more than 320 pixels" is made to correspond to the Y plane for the face position. A decimation rate of ⅛ is made to correspond to the Y plane for the exposure value. A decimation rate of ⅛ is made to correspond to all the planes for the intensity/contrast value. A decimation rate of ½ is made to correspond to the Y plane for the blurring degree. A decimation rate of ¼ is made to correspond to all the planes for the noise degree. In the sampling decimation rate information 31, decimation rates are made to correspond to the respective planes with a tendency in that pixels to be decimated for correction contents grasping tendency of the overall image are larger than pixels to be decimated for correction contents grasping details of the image. Note that as the correction contents grasping the details of the image, for example, the face position, the blurring degree, the noise degree, and the like are included. On the other hand, the correction contents grasping the tendency of the overall image, for example, the exposure degree, the intensity, the contrast, and the like are included. The enhance decimation rate information 32 is used for setting decimation rates when a print image to be used for printing processing is decompressed. In the enhance decimation rate information 32, decimation rates are made to correspond to each of exposure correction, color correction, sharpness, and noise removal as correction contents. If the correction contents are given, the decimation rates can be introduced. In this case, as illustrated in FIG. 2, as the decimation rates, "equal to or larger than a print size" is made to correspond to the Y plane and a "the same decimation rate as Y" is made to correspond to the Cb plane and the Cr plane for the exposure correction and the color correction. Further, "equal to or larger than the print size" is made to correspond to all the planes for the sharpness. In addition, "equal to or larger than the print size" is made to correspond to the Y plane and "¼ size of Y" is made to correspond to the Cb plane and the Cr plane for the noise removal.

Further, the controller 21 includes a correction content setting portion 33, a decimation rate setting portion 34, a sampling processor 35, a correction execution processor 36, and a decompression processor 37 as functional blocks. The correction content setting portion 33 executes processing of setting equal to or more than one correction contents relating to the image data, for example, executes processing of setting contents of correction to be performed on a print image of the image data. The correction content setting portion 33 sets equal to or more than one of the face information (face position), the exposure degree, the intensity, the contrast, the blurring degree and the noise degree as the correction contents. The decimation rate setting portion 34 executes processing of setting decimation rates for the Y plane, the Cb plane, and the Cr plane of the JPEG data based on the set correction contents with the sampling decimation rate information 31 and the enhance decimation rate information 32. The decimation rate setting portion 34 sets the decimation rates of a sampling image to be used for sampling when the contents of correction to be performed on the image data are determined and the decimation rates of print image data to be used for printing in accordance with the correction contents including the face information, the exposure degree, the intensity, the contrast, the blurring degree and the noise degree. The sampling processor 35 executes processing of determining correction values and the like for executing the correction processing by using a decompressed sampling image. The correction execution processor 36 executes processing of reflecting the correction contents set by the correction content setting portion 33 to the image data by using the correction values determined by the sampling processor 35. The decompression processor 37 executes processing of decimating pixels at the set decimation rates and decompressing the JPEG data so as to generate a sampling image and generate a print image. The decompression processor 37 decimates pixels by using the set decimation rate(s) and performs inverse quantization and inverse DCT operation so as to generate image data.

The reading mechanism 25 is of a flat-bed type and is configured as a well-known image scanner including a reading sensor which reads a document placed on a document table as image data (compressed data) and a moving mechanism for moving the reading sensor when the document is read. The reading sensor is a sensor which divides reflected light after emitted toward the document into colors of red (R), green (G), and blue (B) so as to generate scan data.

The printing mechanism 26 is configured as a color printer mechanism of a well-known ink jet type, including a printing head which performs printing by discharging ink onto a print medium. The printing head discharges inks of respective colors through nozzles with a system in which voltage is applied to piezoelectric elements so as to deform the piezoelectric elements and pressurize the inks. It is to be noted that a mechanism of applying pressure to the inks may be a mechanism of generating air bubbles with heat of a heater.

The operation panel 28 includes a display portion 28a and an operation portion 28b. Operation screens of various types on which selection and setting of menus are performed, and the like, are displayed on the display portion 28a. Further, a power supply key for turning the power ON/OFF, a cursor key for moving a cursor to up, down, right and left sides, a cancel key for cancelling input, an enter key for determining a selected content, and the like are included on the operation portion 28b. A direction from a user can be input to the controller 21 on the operation portion 28b.

The memory card reader 30 inputs and outputs data to a memory card inserted into a slot. The memory card reader 30 reads out a file saved in the memory card and transmits the file to the controller 21, and inputs a direction from the controller 21 and writes data into the memory card based on the direction when the memory card is attached.

Next, operations of the printer 20 in the embodiment, which is configured in the above-described manner, in particular, operations when JPEG data is decompressed and predetermined correction is performed on the decompressed image so as to perform printing processing, are described. Processing of reading the JPEG data stored in the memory card, performing decimation processing of pixels, and decompressing the JPEG data are mainly described in detail below. At first, a user attaches the memory card to the memory card reader 30 and selects JPEG data to be printed on a print selection screen (not illustrated). On the print selection screen, correction processing to be performed on a print image can be also set by operating the operation portion 28b. The user operates keys of various types on the operation portion 28b to select an image which is desired to be printed and presses a printing execution key (not illustrated). Then, the CPU 22 executes a printing processing routine stored in the flash memory 24. FIG. 3 is a flowchart illustrating an example of the printing processing routine to be executed by the CPU 22 of the controller 21. In the routine, the CPU 22 performs processing of decompressing the JPEG data and processing of generating a print image by using the correction content setting portion 33, the decimation rate setting portion 34, the sampling processor 35, the correction execution processor 36, and the decompression processor 37.

If the printing processing routine in FIG. 3 is started, the CPU 22 executes correction information setting processing of setting correction contents in accordance with image data, at first (step S100). Then, the CPU 22 executes sampling decimation rate setting processing of setting decimation rates in accordance with the set correction contents for a sampling image (step S110). Thereafter, the CPU 22 executes decimation decompression processing on the sampling image by using the set decimation rates (step S120). Hereinafter, each processing is described in detail.

Figure 4:
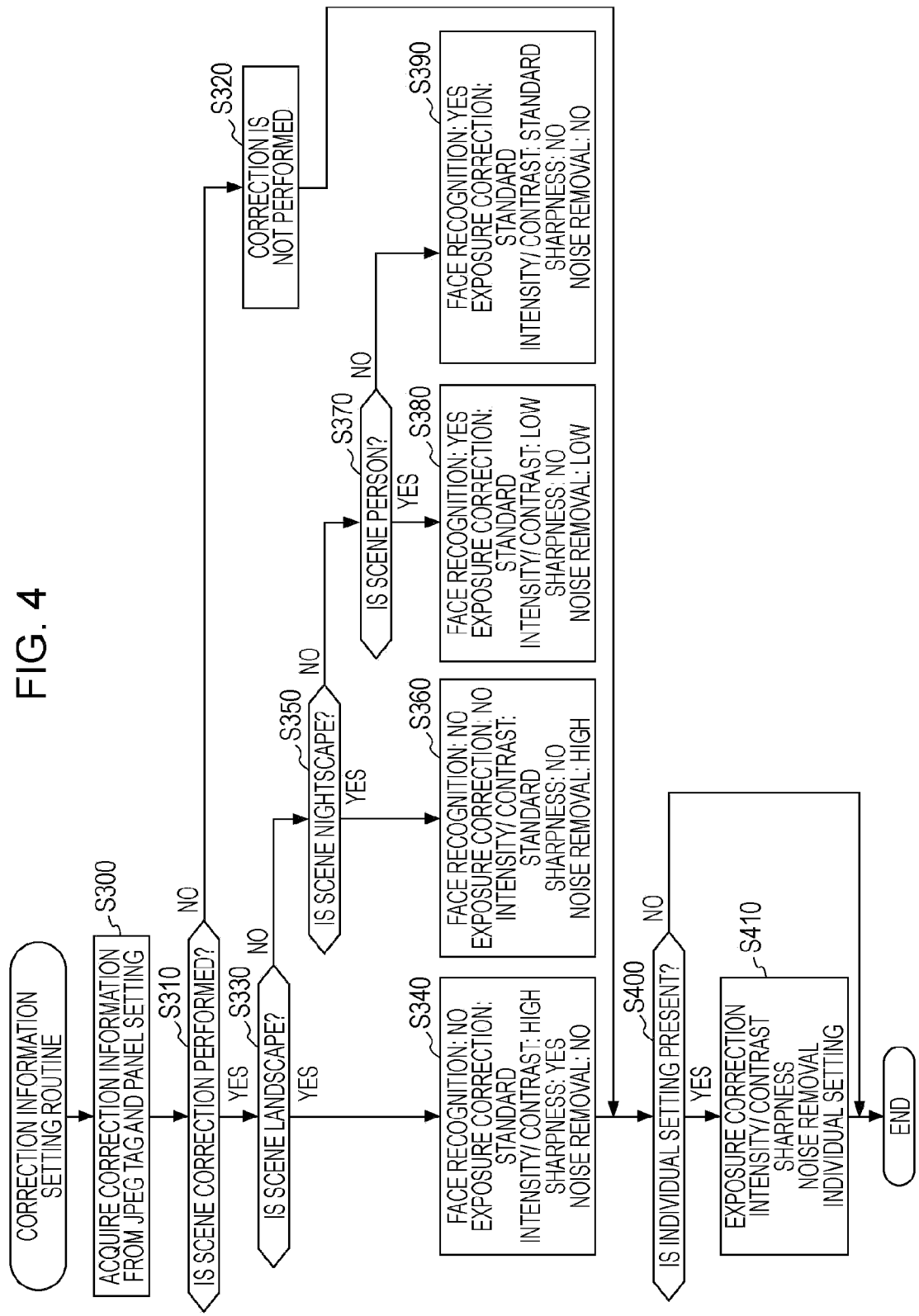
FIG. 4 is a flowchart illustrating an example of a correction information setting routine.

At first, the correction information setting processing at step S100 is described. FIG. 4 is a flowchart illustrating an example of the correction information setting routine. The routine is executed by using the correction content setting portion 33. If the routine is executed, the CPU 22 acquires information stored in a tag of the JPEG data and correction information from input contents on the operation panel 28 (step S300). At this time, the CPU 22 acquires information such as presence/absence of scene correction, a type (landscape, nightscape, person, or the like) of an image scene, and presence/absence of individual setting. Next, the CPU 22 determines whether or not the scene correction is performed (step S310). When it has been determined that the scene correction is not performed, the correction content is set such that the correction is not performed for the JPEG data (step S320). To be more specific, any of face recognition processing, exposure correction processing, intensity/contrast processing, sharpness processing, and noise removal processing are set so as not to be performed. It is to be noted that these correction contents can be set in several levels such as high and low empirically, for example. On the other hand, when it has been determined that the scene correction is performed, the CPU 22 determines whether or not the scene is a landscape (step S330). When it has been determined that the scene is a landscape, a well-modulated image may be preferred. Therefore, the correction contents are set such that the face recognition processing is not performed, the exposure correction processing is performed in a standard level, the intensity/contrast processing is performed in a high level, the sharpness processing is performed, and the noise removal processing is not performed (step S340).

On the other hand, when it has been determined that the scene is not a landscape at step S330, the CPU 22 determines whether or not the scene is a nightscape (step S350). When it has been determined that the scene is nightscape, an image is dark. Therefore, the correction contents are set such that the face recognition processing is not performed, the exposure correction processing is not performed, the intensity/contrast processing is performed in a standard level, the sharpness processing is not performed, and the noise removal processing is performed in a high level (step S360). On the other hand, when it has been determined that the scene is not nightscape at step S350, the CPU 22 determines whether or not the scene is a person (step S370). When it has been determined that the scene is a person, the correction contents are set such that the face recognition processing is performed, the exposure correction processing is performed in a standard level, the intensity/contrast processing is performed in a low level, the sharpness processing is not performed, and the noise removal processing is performed in a low level in consideration of correction of skin (step S380). On the other hand, when it has been determined that the scene is not a person at step S370, the CPU 22 considers the scene as another scene and sets the correction contents in the following regular setting manner. That is, the correction contents are set such that the face recognition processing is performed, the exposure correction processing is performed in a standard level, the intensity/contrast processing is performed in a standard level, the sharpness processing is not performed, and the noise removal processing is not performed (step S390).

Further, after steps S320, S340, S360, S380, and S390, the CPU 22 determines whether or not the individual setting is present (step S400). When it has been determined that the individual setting is absent, the routine is finished as it is. When it has been determined that the individual setting is present, the exposure correction value, the intensity/contrast value, the sharpness value, the noise removal processing value, and the like are set individually (step S410), and the routine is finished. For example, the individual setting is information which has been set individually for a JPEG tag (for example, exposure value is X), or information which has been set individually by a user on the operation panel 28. Further, the individual setting may be set by adding an individual setting value to the value set in the above-described processing. In addition, when a plurality pieces of JPEG data to be printed are present, for the times of the number of JPEG data, the above-described correction information setting routine is repeatedly executed and the correction contents which have been made to correspond to the respective pieces of JPEG data are stored in a predetermined region of the RAM 23.

Figure 5:
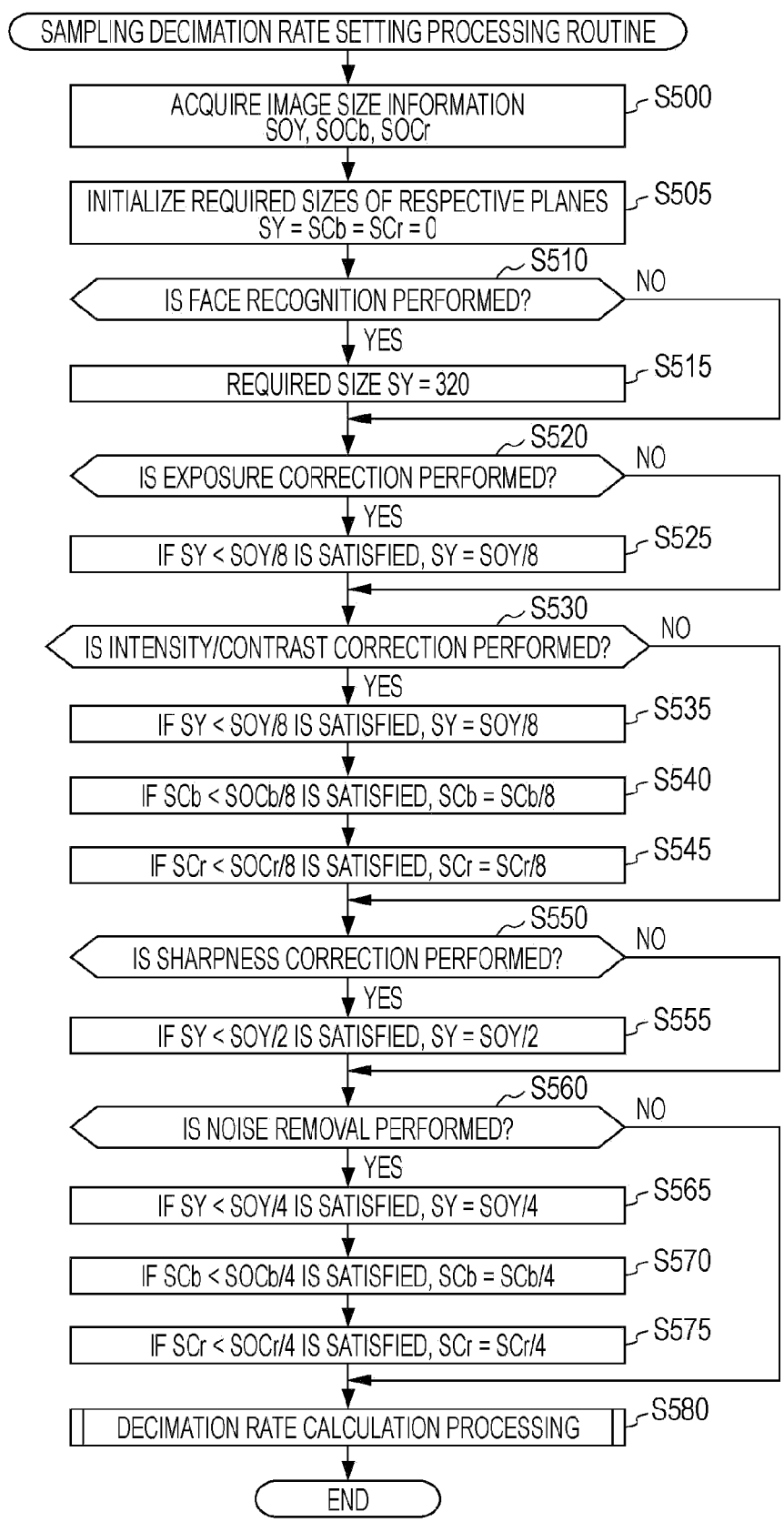
FIG. 5 is a flowchart illustrating an example of a sampling decimation rate setting processing routine.

Next, the sampling decimation rate setting processing at step S110 is described. FIG. 5 is a flowchart illustrating an example of the sampling decimation rate setting processing routine. The sampling decimation rate setting processing is executed with the sampling decimation rate information 31 by using the decimation rate setting portion 34. In the routine, required sizes of images are set from the set correction contents (S500 to S575). Then, processing of setting the decimation rates at which the decimation is executed specifically from the set required sizes (S580). If the routine is executed, the CPU 22 acquires information of image sizes of the JPEG data (step S500). As the information of the image size, information indicating that components of the JPEG are 4:2:0, 4:2:2, or 4:4:4, a size SOY of the Y plane, a size SOCb of the Cb plane, and a size SOCr of the Cr plane of the JPEG, and the like are acquired. Hereinafter, long sides of the respective planes are selected so as to perform the processing. Further, when the components of JPEG are 4:2:0, SOY=SOCb×2=SOCr×2 is made to be satisfied for making sizes uniform.

Next, required sizes of the respective planes are initialized (step S505). The required size SY of the Y plane, the required size SCb of the Cb plane, and the required size SCr of the Cr plane are set so as to satisfy SY=SCb=SCr=0. Subsequently, the CPU 22 determines whether or not the face recognition is performed based on the correction content stored in the RAM 23 (step S510). When it has been determined that the face recognition is performed, 320 pixels (long side) are set to the required size SY based on the correspondence information in the sampling decimation rate information 31 (step S515). In the same manner, the required size SY, the required size SCb, and the required size SCr are set based on the correction contents stored in the RAM 23 and the correspondence information in the sampling decimation rate information 31.

When it has been determined that the face recognition is not performed at step S510, or after step S515, the CPU 22 determines whether or not the exposure correction is performed (step S520). When it has been determined that the exposure correction is performed, if a value obtained by dividing the Y size SOY by 8 is larger than the required size SY, a size SOY/8 is set to the required size SY (step S525). Next, when it has been determined that the exposure correction is not performed at step S520, or after step S525, the CPU 22 determines whether or not the intensity/contrast correction is performed (step S530). When it has been determined that the intensity/contrast correction is performed, if a value obtained by dividing the size SOY by 8 is larger than the required size SY, the size SOY/8 is set to the required size SY (step S535). Further, if a value obtained by dividing the size SOCb by 8 is larger than the required size SCb, the size SOCb/8 is set to the required size SCb (step S540). In addition, if a value obtained by dividing the size SOCr by 8 is larger than the required size SCr, the size SOCr/8 is set to the required size SCr (step S545). Next, when it has been determined that the intensity/contrast correction is not performed at step S530, or after step S545, the CPU 22 determines whether or not the sharpness correction is performed (step S550). When it has been determined that the sharpness correction (blurring degree correction) is performed, a value obtained by dividing the size SOY by 2 is larger than the required size SY, the size SOY/2 is set to the required size SY (step S555). Next, when it has been determined that the sharpness correction is not performed at step S550, or after step S555, the CPU 22 determines whether or not the noise removal is performed (step S560). When it has been determined that the noise removal is performed, if a value obtained by dividing the size SOY by 4 is larger than the required size SY, the size SOY/4 is set to the required size SY (step S565). Further, if a value obtained by the size SOCb by 4 is larger than the required size SCb, the size SOCb/4 is set to the required size SCb (step S570). In addition, if a value obtained by dividing the size SOCr by 4 is larger than the required size SCr, the size SOCr/4 is set to the required size SCr (step S575).

Figure 6:
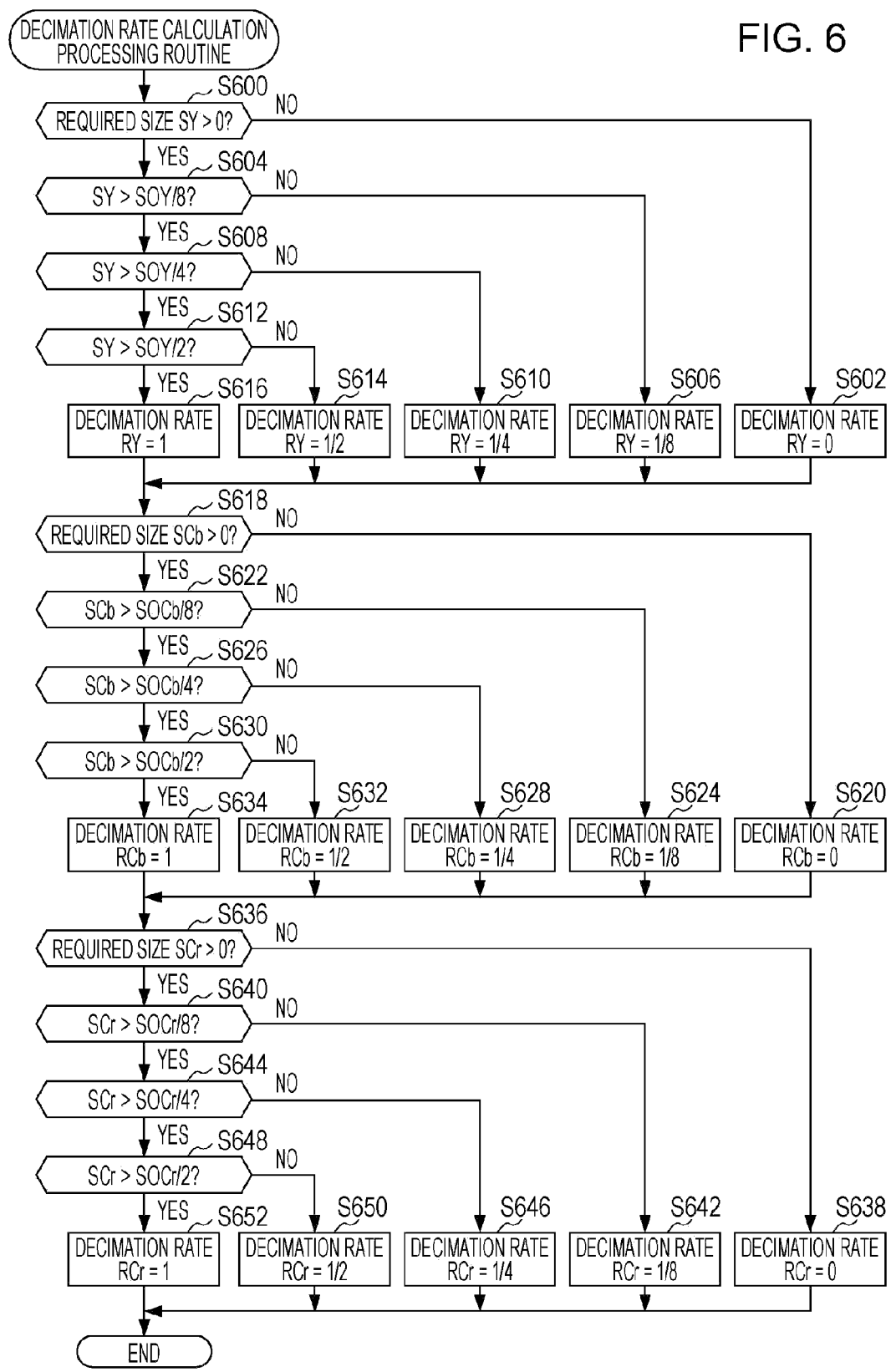
FIG. 6 is a flowchart illustrating an example of a decimation rate calculation processing routine.

Subsequently, when it has been determined that the noise removal is not performed at step S560, or after step S575, the CPU 22 executes decimation rate calculation processing of calculating decimation rates to be applied to the respective planes (step S580), and the routine is finished. FIG. 6 is a flowchart illustrating an example of the decimation rate calculation processing routine. If the routine is executed, the CPU 22 determines whether or not the required size SY is larger than 0 (step S600). If the required size SY is not larger than 0, a value 0 is set to the decimation rate RY of the Y plane (step S602). The expression, the decimation rate is "0", indicates that all the pixels are decimated, that is, the plane is not decompressed. On the other hand, if the required size SY is larger than 0 at step S600, the CPU 22 determines whether or not the required size SY is larger than the size SOY/8 (step S604). If the required size SY is not larger than the size SOY/8, ⅛ is set to the decimation rate RY (step S606). On the other hand, if the required size SY is larger than the size SOY/8 at step S604, the CPU 22 determines whether or not the required size SY is larger than the size SOY/4 (step S608).

If the required size SY is not larger than size SOY/4, ¼ is set to the decimation rate RY (step S610). On the other hand, if the required size SY is larger than the size SOY/4 at step S608, the CPU 22 determines whether or not the required size SY is larger than the size SOY/2 (step S612). If the required size SY is not larger than the size SOY/2, ½ is set to the decimation rate RY (step S614). On the other hand, if the required size SY is larger than the size SOY/2 at step S612, a value 1 is set to the decimation rate RY (step S616). The expression, the decimation rate is the value 1, indicates that the decompression processing of the plane is performed without performing decimation. The same processing as that performed on the Y plane is also performed on the Cb plane (steps S618 to S634). Further, the same processing as that performed on the Y plane is also performed on the Cr plane (steps S636 to S652). Then, the routine is finished. In addition, when there are a plurality of pieces of JPEG data to be printed, for the times of the number of JPEG data, the above-described sampling decimation rate setting processing routine is repeatedly executed and the decimation rates which have been made to correspond to the pieces of JPEG data are stored in the predetermined region of the RAM 23. By performing the processing, the decimation rates for the respective planes are set so as to make the image sizes larger than the required sizes based on the sizes of the respective planes. In addition, the decimation rates for generating larger image data are set to the decimation rates for the respective planes among the decimation rates which have been made to correspond to the plurality of set correction contents.

Figure 7:
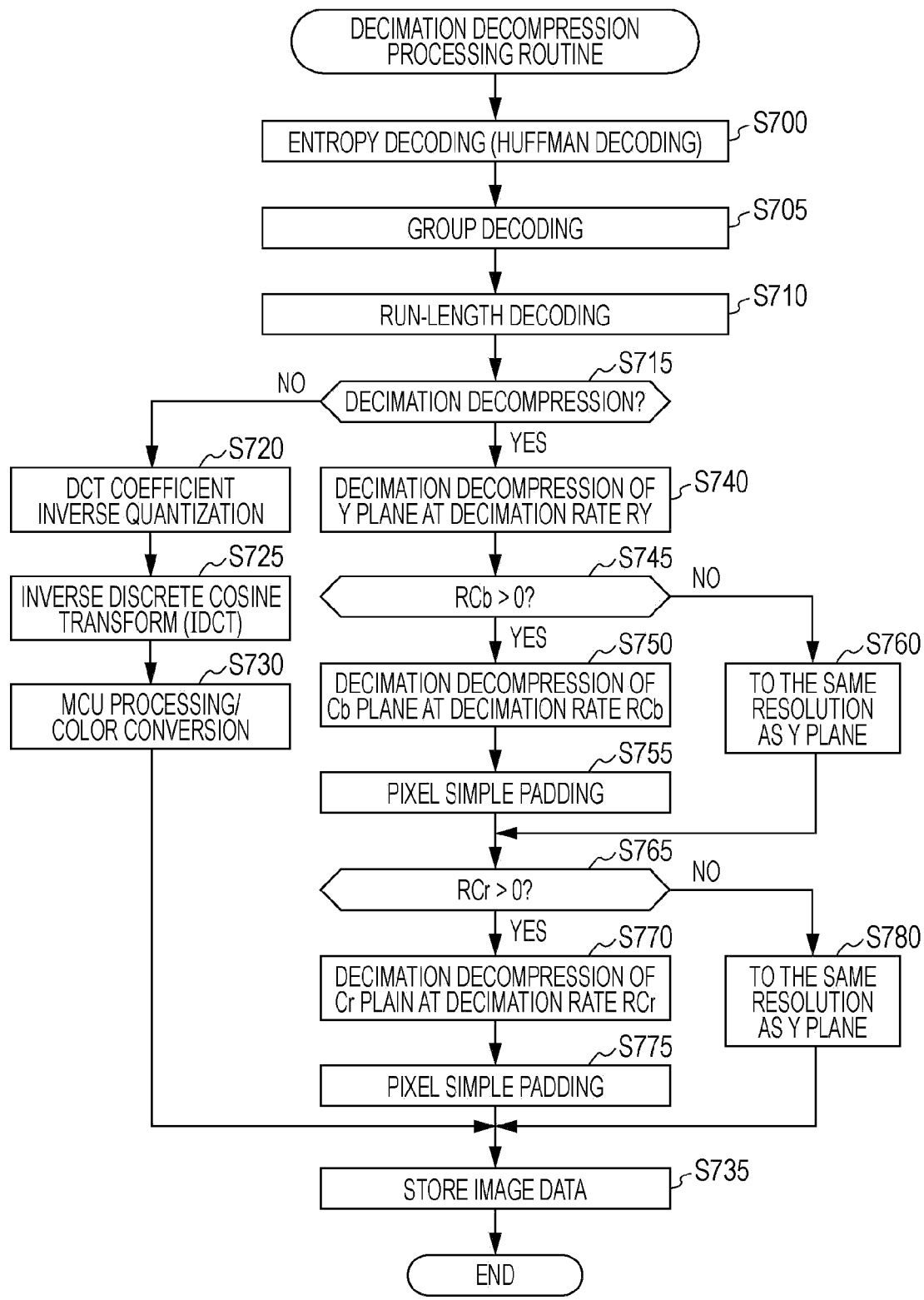
FIG. 7 is a flowchart illustrating an example of a decimation decompression processing routine.

Next, the decimation decompression processing at step S120 is described. FIG. 7 is a flowchart illustrating an example of the decimation decompression processing routine. The routine is executed by using the decompression processor 37. In the decimation decompression processing at step S120, the decompression processing of the sampling image is executed. If the routine is executed, the CPU 22 performs entropy decoding (Huffman decoding) on the JPEG data (step S700). Then, the CPU 22 performs group decoding thereon (step S705), and performs run-length decoding thereon (step S710). As a result, frequency blocks of DCT coefficients of N×N (for example, N is 8) before quantization are obtained. In this state, a state where so-called decimation processing can be performed while using desired values from the blocks of N×N is made. Next, the CPU 22 determines whether or not the decimation decompression processing is performed based on the decimation rates which have been made to correspond to the JPEG data (step S715). When it has been determined that the decimation decompression processing is not performed, the CPU 22 performs the inverse quantization of the DCT coefficients on the frequency blocks of the DCT coefficients (step S720), performs inverse discrete cosine transform (IDCT) (step S725), performs minimum coding unit (MCU) processing and color conversion (step S730), and stores the image data (step S735). With this, the routine is finished. In the processing, processing load of the inverse DCT operation is the largest and much time is required for the processing. The inverse DCT operation and the like have been described in detail in JP-A-2002-271794 and the like and description thereof is omitted. Further, the MCU processing and the color conversion may correct pixel values obtained in the processing, for example. It is to be noted that the inverse quantization of the DCT coefficients and the inverse discrete cosine transform are performed for each of the plans if necessary.

Figure 8:
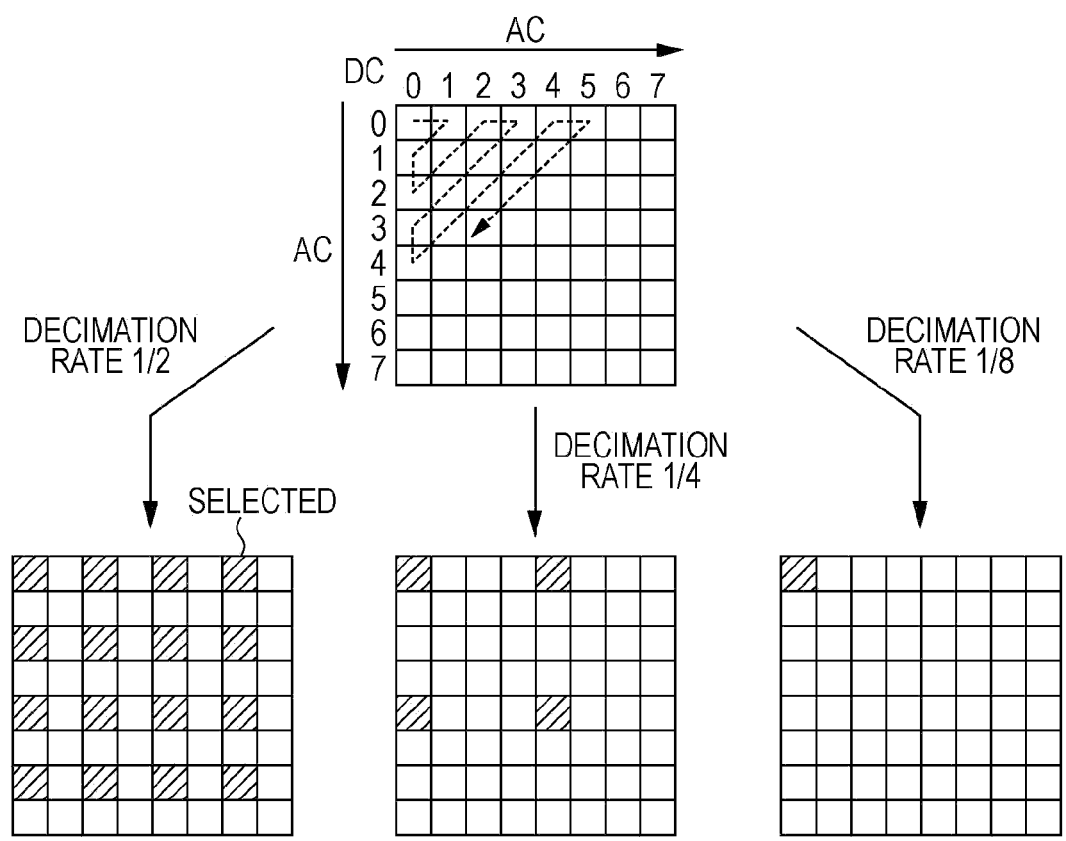
FIG. 8 is a conceptual view illustrating decimation decompression processing.

On the other hand, when it has been determined that the decimation decompression processing is performed at step S715, the Y plane is decimated at the decimation rate RY to be decompressed (step S740). FIG. 8 is a conceptual view illustrating the decimation decompression processing. As illustrated in FIG. 8, when the frequency blocks of the DCT coefficients of 8×8 are decimated at the decimation rate of ½, for example, frequency components on which the subsequent processing is performed are selected such that 16 blocks in total of 4×4 obtained by multiplying the number of blocks in both of the lateral and longitudinal directions by ½ are left in a diverse manner among 64 blocks in total of 8×8. Further, when the frequency blocks are decimated at the decimation rate of ¼, frequency components on which the subsequent processing is performed are selected such that 4 blocks in total of 2×2 obtained by multiplying the number of blocks in both of the lateral and longitudinal directions by ¼ are left in a diverse manner among 64 blocks in total of 8×8, for example. Alternatively, when the frequency blocks are decimated at the decimation rate of ⅛, frequency components on which the subsequent processing is performed are selected such that one block obtained by multiplying the number of blocks in both of the lateral and longitudinal directions by ⅛ is left among 64 blocks in total of 8×8, for example. Then, the inverse quantization of the DCT coefficients, the IDCT, the MCU processing, and the color conversion which are the same as those in the above-described steps S720 to S730 are performed on the selected DCT coefficients so as to obtain pixels of the Y plane. Thus, the times of the inverse DCT operation with large processing load can be reduced in accordance with the decimation rates. With this, processing the load and processing time can be further reduced. It is to be noted that when the DCT coefficients are processed, scanning may be performed in a zigzag manner as illustrated in an upper stage in FIG. 8. This makes it possible to further realize high-speed processing.

Subsequently, the CPU 22 determines whether or not the decimation rate RCb of the Cb plane is larger than a value 0 (step S745). If the decimation rate RCb is larger than the value 0, the Cb plane is decimated at the decimation rate RCb to be decompressed by the processing which is the same as that for the above-described Y plane (step S750). Then, simple padding processing of pixels is performed so as to make the Cb plane have the same resolution as the Y plane (step S755). On the other hand, if the decimation rate RCb is not larger than a value 0, that is, if RCb is 0, the decompression of the Cb plane is not performed and processing of making the Cb plane have the same resolution as that of the Y plane is performed (step S760). To be more specific, the processing of filling the entire plane with a value 128 is performed. Next, the CPU 22 determines whether or not the decimation rate RCr of the Cr plane is larger than a value 0 (step S765). If the decimation rate RCr is larger than the value 0, the Cr plane is decimated at the decimation rate to be decompressed by the processing which is the same as that for the above-described Y plane (step S770). Then, simple padding processing of pixels is performed so as to make the Cr plane have the same resolution as the Y plane (step S775). On the other hand, if the decimation rate RCr is not larger than the value 0, that is, if RCr is 0, decompression of the Cr plane is not performed and processing of making the Cr plane have the same resolution as that of the Y plane is performed (step S780). To be more specific, the processing of filling the entire plane with a value 128 is performed. Then, image data is generated by using Y, Cb, and Cr planes to be stored in the predetermined region of the RAM 23 (step S735). With this, the routine is finished. In this manner, decimation processing is performed to decompress the respective planes.

Then, description is returned to the printing processing routine in FIG. 3. At step S120, if the decimation decompression processing has been executed, the CPU 22 converts image data of YCC to image data of an RGB/HLS color space (step S130), and contracts and stores the image data (step S140). In the conversion processing of the color space, for example, conversion from the YCC color space to the RGB color space may be performed with a well-known method by using a look-up table or the like. Further, in the contraction and storage of the image data, the decompressed image data is contracted to a predetermined small size for face recognition to be stored regardless of whether or not the decimation processing has been performed. Subsequently, the CPU 22 performs calculation of histograms of Y, R, G, B, H, L, and S with the decompressed sampling image by using the sampling processor 35 and correction values of the respective correction contents, and the like, are determined (step S150). Then, the CPU 22 determines whether or not the sampling has been finished (step S160). When it has been determined that the sampling has not been finished, processing subsequent to step S120 is repeated and the sampling images which have been made to correspond to the pieces of JPEG data are stored in the predetermined region of the RAM 23.

When it has been determined that the sampling has been finished at step S160, the CPU 22 determines whether or not the face recognition is set to be performed as the correction content (step S170). When it has been determined that the face recognition is performed as the correction content, well-known face recognition processing is executed by using the image data which has been contracted and stored at step S140 (step S180). In the face recognition processing, processing of specifying a region on which a face is present based on whether or not there is a region of eyes and a region corresponding to a mouth in the vicinity of the region of eyes is executed. Subsequently, the CPU 22 determines whether or not the face region is present on an image (step S190). When it has been determined that the face region is absent, or when it has been determined that the face recognition is not performed as the correction content at step S170, calculation of an enhance parameter for optimization of an overall image is executed in consideration of the blurring degree and the like (step S200). With this, the enhance parameter of the JPEG data is determined. On the other hand, when it has been determined that the face region is present at step S190, the calculation of the enhance parameter for optimization of a face color is executed in consideration of the blurring degree and the like (step S210). With this, the enhance parameter of the JPEG data is determined. The calculation of the enhance parameter is performed by appropriately using the correction values of the respective correction contents at step S150.

Figure 9:
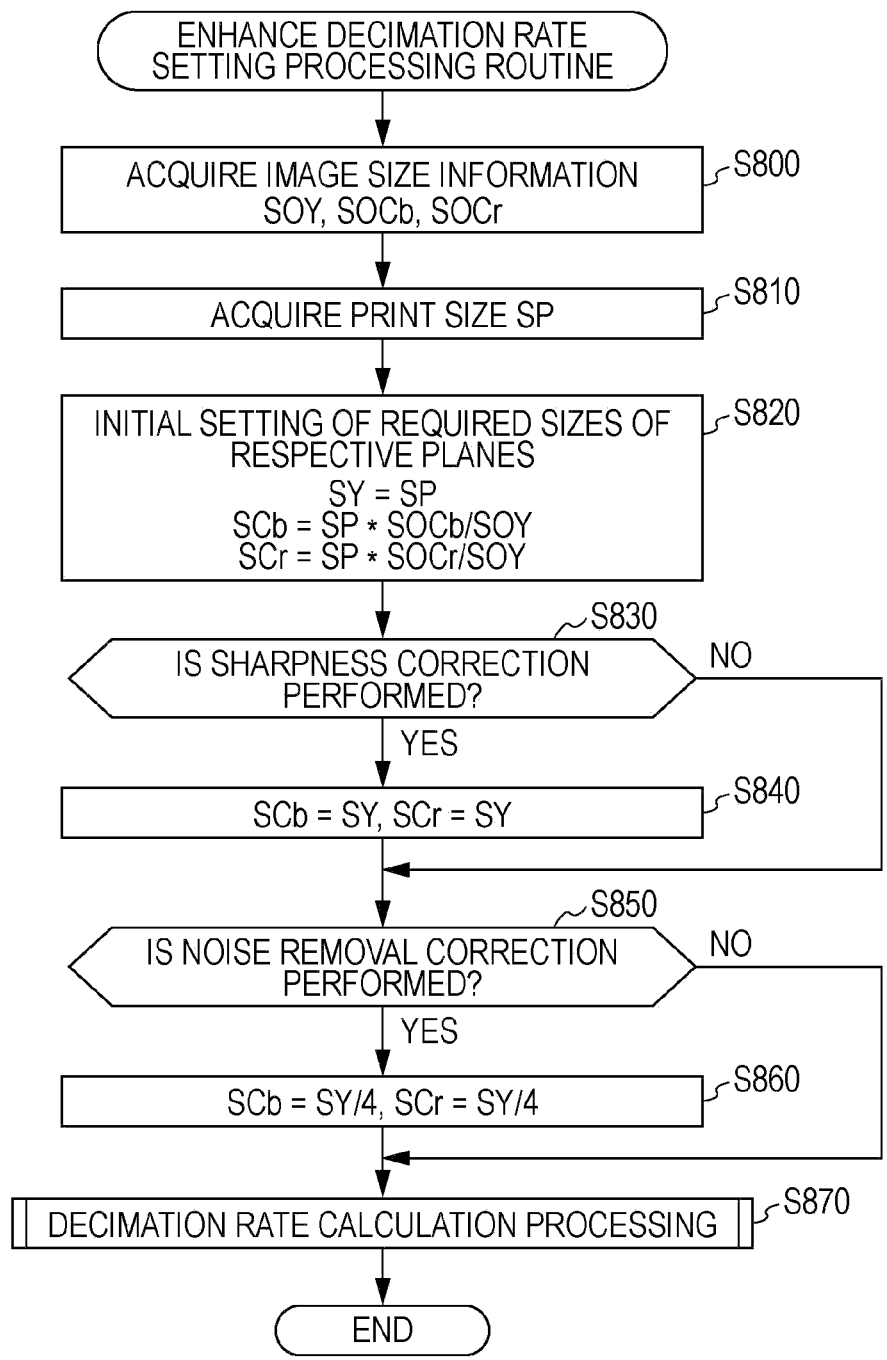
FIG. 9 is a flowchart illustrating an example of an enhance decimation rate setting processing routine.

After steps S200 and S210, the CPU 22 executes enhance decimation rate setting processing of setting decimation rates when the print image data is decompressed (step S220). FIG. 9 is a flowchart illustrating an example of the enhance decimation rate setting processing routine. The enhance decimation rate setting processing is executed with the enhance decimation rate information 32 by using the decimation rate setting portion 34. In the routine, a required sizes of images are set from the set correction contents (S800 to S860). Then, processing of setting the decimation rates at which the decimation is executed specifically from the set required sizes (S870). If the routine is executed, at first, the CPU 22 acquires image sizes SOY, SOCb, and SOCr of the JPEG data (step S800) and acquires a print size SP from the print setting (step S810). In this case, the processing is also performed by selecting long sides of the respective planes. When the components of JPEG are 4:2:0, SOY=SOCb×2=SOCr×2 is made to be satisfied for making sizes uniform. Next, initial setting of required sizes of the planes of Y, Cb and Cr is performed (step S820). The print size SP is set to the required size SY of the Y plane. Further, as the required size SCb of the Cb plane, a value (SP×SOCb/SOY) obtained by multiplying the image size SOCb by the print size SP and dividing the obtained value by the image size SOY is set. Further, as the required size SCr of the Cr plane, a value (SP×SOCr/SOY) obtained by multiplying the image size SOCr by the print size SP and dividing the obtained value by the image size SOY is set. The processing indicates that the decimation rate of the Y plane is set to equal to or larger than the print size, and decimation rates of the Cb and Cr planes are set to those which are the same as that of the Y plane for the exposure correction and color correction. In the processing of correcting color as in the exposure correction, special consideration for resolution is not required. Therefore, the same decimation rate is set for all the planes in consideration of balance between image quality and processing speed.

Subsequently, the CPU 22 determines whether or not the sharpness correction is set to be performed as the correction content (step S830). When it has been determined that the sharpness correction is performed, the required size SY of the Y plane is set to each of the required sizes SCb and SCr of the Cb and Cr planes (step S840). That is to say, when the sharpness correction is executed, the required sizes of the respective planes are set to equal to or larger than the print size. The resolution is given preference for the sharpness. Therefore, in order to decrease the decimation rates as low as possible, for example, the required sizes of the Cb and Cr planes are set to the same as that of the Y plane (decimation rates for the Cb and Cr planes are set to twice as that of the Y plane) even an image of which Cb and Cr planes are ½ of the Y plane as in the JPEG data having components of 4:2:0. With this, the pixel values of the Cb and Cr planes can be effectively used. After step S840, or when it has been determined that the sharpness correction is not performed at step S830, the CPU 22 determines whether or not the noise removal is set to be performed as the correction content (step S850). When the noise removal is performed, the print size SP/4 is set to each of the required sizes of the Cb and Cr planes (step S860). That is to say, when the noise removal is executed, the required sizes of the Cb and Cr planes are set to ¼ size of the Y plane. In the noise removal, for example, noise such as shortage of a light amount of a digital camera is included in the Cb and Cr planes as color difference components in some cases. Therefore, the decimation rates for the Cb and Cr planes are increased so as to relatively reduce areas thereof and a smoothing filter is applied over a larger range. It is to be noted that the decimation processing has not only an effect of lowering of the resolution simply but also an effect of smoothing. Therefore, there is an advantage that the noise removal can be executed by the decimation processing itself. Then, after step S860, or when it has been determined that the noise removal is not performed as the correction content at step S850, the decimation rate calculation processing is executed (step S870). With this, the routine is finished. In the decimation rate calculation processing, the above-described decimation rate calculation processing routine as illustrated in FIG. 6 is executed and the decimation rates for the respective planes of Y, Cb, and Cr are set. The decimation rates for the respective planes are set such that the image size is made to be larger than the print size based on the sizes of the respective planes. Further, among the decimation rates which have been made to correspond to the plurality of correction contents, the decimation rates for making larger print image data are set as the decimation rates for the respective planes.

Meanwhile, description is returned to the printing processing routine in FIG. 3. If the enhance decimation rate setting processing has been executed at step S220, the CPU 22 executes the decimation decompression processing (step S230). In this case, the decimation decompression processing in FIG. 7 is executed by using the decompression processor 37 based on the decimation rates set at step S220 in the same manner as the decimation decompression processing at step S120. In the decimation decompression processing at step S230, the decompression processing of a print image is executed. Also at step S230, pixels are decimated at the decimation rates set in accordance with the correction contents and the decompression processing is performed on the print JPEG data. Therefore, the times of the inverse DCT operations with large processing load can be reduced in accordance with the decimation rates so that the processing load and the processing time can be further reduced.

If the decimation decompression processing has been executed, the CPU 22 converts the image data of YCC to image data of the RGB/HLS color space (step S240). The CPU 22 executes the sharpness processing if necessary (step S250), executes the color correction processing if necessary (step S260), and executes the noise removal processing if necessary (step S270). These correction processing are executed by the correction execution processor 36 by using the enhance parameter set at steps S200 and S210. Next, the printing processing is executed by using the decompressed print image data (step S280). The CPU 22 determines whether or not the printing has been finished based on whether or not all the pieces of JPEG data selected for printing have been processed (step S290). With this, when it has been determined that the printing has not been finished, processing subsequent to step S230 is executed. When it has been determined that the printing has been finished, the routine is finished.

A correspondence relationship between constituent components in the embodiment and constituent components in the invention is made clear. The correction content setting portion 33 in the embodiment corresponds to a correction content setting unit in the invention. The decimation rate setting portion 34 in the embodiment corresponds to a decimation rate setting unit in the invention. The decompression processor 37 in the embodiment corresponds to a decompression processing unit in the invention. It is to be noted that in the embodiment, an example of an image processing method according to the invention is made clear by describing the operations of the printer 20.

With the printer 20 in the embodiment as described in detail above, equal to or more than one correction contents are set and decimation rates for the respective planes of Y, Cb, and Cr of the JPEG data (compressed data) are set based on the set correction contents. Then, pixels are decimated at the set decimation rates and the JPEG data is decompressed so as to generate image data. In this manner, the decimation processing is performed in accordance with the plurality of correction contents. Therefore, for example, the inverse quantization processing, the inverse DCT operation processing, and the like can be omitted in accordance with the correction contents. Accordingly, the load and processing time of the decompression processing to be performed on the compressed data can be reduced more appropriately. In addition, the decimation processing is performed in accordance with the face information, the exposure degree, the intensity, the contrast, the blurring degree and the noise degree. Therefore, the load and processing time of the decompression processing to be performed on the compressed data can be reduced in accordance with the respective correction contents more appropriately. Further, when the sampling image is generated and when the print image data is generated, the load and processing time of the decompression processing to be performed on the compressed data can be reduced more appropriately. In addition, processing is performed with a tendency in that pixels to be decimated are smaller for the correction contents grasping the details of the image. On the other hand, the decimation processing is performed with a tendency in that pixels to be decimated are larger for the correction contents grasping the tendency of the overall image. Therefore, the sampling image can be generated by executing more appropriate decimation processing. Then, the decimation rates of the print image data are set so as to generate an image having a size equal to or larger than a specified print size. Therefore, the load and processing time of the decompression processing to be performed on the compressed data can be reduced more appropriately while further suppressing lowering of image quality of the print image. Further, the decimation rates for generating larger image data are set to the decimation rates for the respective planes among the decimation rates which have been made to correspond to the plurality of set correction contents. With this, the load and processing time of the decompression processing to be performed on the compressed data can be reduced more appropriately while further suppressing lowering of image quality of the print image. In addition, in the apparatuses such as the printer 20, the performance of a controller is limited. Therefore, the application of the invention to the apparatuses has a significant advantage.

It is to be noted that the invention is not limited to the above-described embodiment. It is needless to say that the invention can be executed in various modes within the technical scope of the invention.

For example, in the above-described embodiment, the face information, the exposure degree, the intensity, the contrast, the blurring degree and the noise degree have been described as the correction contents. However, the correction contents are not particularly limited thereto and equal to or more than one of them may be omitted or a correction content other than them may be added. Even with this configuration, the load and processing time of the decompression processing to be performed on the compressed data can be reduced in accordance with the correction contents more appropriately.

In the above-described embodiment, the decompression processing is performed at the decimation rates in accordance with the correction contents when the sampling image is decompressed and when the print image is decompressed. However, the decompression processing may be performed either when the sampling image is decompressed or when the print image is decompressed. Alternatively, the decompression processing may be performed at the decimation rates in accordance with the correction contents when another image is decompressed, for example, when a display image is decompressed. Even with this configuration, the load and processing time of the decompression processing to be performed on the compressed data can be reduced in accordance with the correction contents more appropriately.

In the above-described embodiment, the decimation rates for the respective planes are set with a tendency in that pixels to be decimated for correction contents grasping tendency of the overall image are larger than pixels to be decimated for correction contents grasping details of the image. However, the invention is not particularly limited thereto and setting of the decimation rates may be defined empirically in accordance with the correction contents and the like. Further, in the above-described embodiment, decimation rates of the print image data are set such that an image having an equal to or larger than a print size is generated. However, the invention is not particularly limited thereto.

In the above-described embodiment, when the printing processing is executed, the decimation processing is executed to decompress the compressed data so as to generate image data. However, the invention is not particularly limited thereto and the compressed data may be decompressed so as to generate display image data.

In the above-described embodiment, the compressed data stored in the memory card attached to the memory card reader 30 is decompressed to perform printing. However, the invention is not particularly limited thereto as long as the compressed data which has been compressed with a compression method with DCT operation is decompressed so as to generate image data. For example, a case where compressed data read by the reading mechanism 25 is decompressed or compressed data transmitted from the PC 40 is decompressed may be employed.

In the above-described embodiment, the compressed data has been described as the JPEG data. However, the invention is not particularly limited thereto as long as the compressed data which has been compressed with a compression method with DCT operation is employed. For example, MPEG data may be used as the compressed data.

In the above-described embodiment, the multifunction printer which can execute printing, scanning, and copying has been described as the image processing device according to the invention. However, a printer unit, a scanner unit, facsimile, or the like may be employed as the image processing device. Alternatively, the device is not particularly limited as long as the device is a device which decompresses compressed data which has been compressed with a compression method with DCT operation so as to generate image data. For example, information processing devices such as a personal computer and a notebook computer, photographing devices such as a digital still camera and a digital video camera, video image devices such as a digital television and an HDD recorder, mobile and household game devices, and communication devices such as a mobile phone may be employed. In addition, in the above-described embodiment, as the reading mechanism 25, a flat-bed-type reading mechanism which fixes a document and moves a reading sensor so as to read an image has been employed. However, the reading mechanism 25 may employ a system in which a reading sensor is fixed and a document is moved so as to read an image. In addition, as the printing mechanism 26, an ink jet printing mechanism has been employed. However, an electro photographic system, a thermal transfer system, or a dot impact system may be employed as the printing mechanism 26. Moreover, the invention has been described using mode of the printer 20. However, the invention may be realized in a mode of an image processing method or a mode of programs of the method.

What is claimed is:

1. An image processing device that decompresses compressed data which has a plurality of planes and has been compressed with a compression method with DCT operation so as to generate image data, the image processing device comprising:
    a correction content setting unit that sets equal to or more than one correction contents relating to the image data;
    a decimation rate setting unit that sets a decimation rate for each of the plurality of planes based on the set correction contents,
    and a decompression processing unit that decimates pixels at the decimation rate set for each of the plurality of planes and decompresses the compressed data so as to generate the image data.

2. The image processing device according to claim 1,
wherein the correction content setting unit sets the correction contents including equal to or more than one of face information, exposure degree, intensity, contrast, blurring degree and noise degree, and the decimation rate setting unit sets the decimation rates for the planes in accordance with the correction contents including equal to or more than one of the face information, the exposure degree, the intensity, the contrast, the blurring degree and the noise degree.

3. The image processing device according to claim 1,
wherein the decimation rate setting unit sets decimation rates of a sampling image to be used for sampling when the contents of correction to be performed on the image data are determined, and the decompression processing unit decimates pixels at the set decimation rates so as to generate the sampling image.

4. The image processing device according to claim 3,
wherein the decimation rate setting unit sets the decimation rates for the planes with a tendency in that pixels to be decimated for correction contents grasping tendency of an overall image are larger than pixels to be decimated for correction contents grasping details of the image.

5. The image processing device according to claim 1,
wherein the correction content setting unit sets contents of correction to be performed on a print image of the image data, the decimation rate setting unit sets decimation rates of the print image data, and the decompression processing unit decimates pixels at the set decimation rates so as to generate the print image.

6. The image processing device according to claim 5,
wherein the decimation rate setting unit sets the decimation rates of the print image data such that an image having a size of equal to or larger than a specified print size is generated.

7. The image processing device according to claim 1,
wherein the correction content setting unit sets a plurality of correction contents, and the decimation rate setting unit sets decimation rates for generating larger image data among decimation rates which are made to correspond to the plurality of set correction contents to the decimation rates for the planes.

8. The image processing device according to claim 1,
wherein the compressed data is any one or both of JPEG data and MPEG data.

9. An image processing method for decompressing compressed data which has a plurality of planes and has been compressed with a compression method with DCT operation so as to generate image data, the image processing method comprising:

setting equal to or more than one correction contents relating to the image data;

setting a decimation rate for each of the plurality of planes based on the set correction contents, and decimating pixels at the decimation rate set for each of the plurality of planes and decompressing the compressed data so as to generate the image data.

10. An image processing device that decompresses compressed data which has a plurality of planes and has been compressed with a compression method with DCT operation so as to generate image data, the image processing device comprising:

a microprocessor that sets equal to or more than one correction contents relating to the image data; sets a decimation rate for each of the plurality of planes based on the set correction contents, and decimates pixels at the decimation rate set for each of the plurality of planes and decompresses the compressed data so as to generate the image data.

11. The image processing device according to claim 10,
wherein the microprocessor sets the correction contents including equal to or more than one of face information, exposure degree, intensity, contrast, blurring degree and noise degree, and sets the decimation rates for the planes in accordance with the correction contents including equal to or more than one of the face information, the exposure degree, the intensity, the contrast, the blurring degree and the noise degree.

12. The image processing device according to claim 10,
wherein the microprocessor sets decimation rates of a sampling image to be used for sampling when the contents of correction to be performed on the image data are determined, and decimates pixels at the set decimation rates so as to generate the sampling image.

13. The image processing device according to claim 12,
wherein the microprocessor sets the decimation rates for the planes with a tendency in that pixels to be decimated for correction contents grasping tendency of an overall image are larger than pixels to be decimated for correction contents grasping details of the image.

14. The image processing device according to claim 10,
wherein the microprocessor sets contents of correction to be performed on a print image of the image data, sets decimation rates of the print image data, and decimates pixels at the set decimation rates so as to generate the print image.

15. The image processing device according to claim 14,
wherein the microprocessor sets the decimation rates of the print image data such that an image having a size of equal to or larger than a specified print size is generated.

16. The image processing device according to claim 10,
wherein the microprocessor sets a plurality of correction contents, and sets decimation rates for generating larger image data among decimation rates which are made to correspond to the plurality of set correction contents to the decimation rates for the planes.

17. The image processing device according to claim 10,
wherein the compressed data is any one or both of JPEG data and MPEG data.

* * * * *